US010124685B2

(12) United States Patent
Yuasa et al.

(10) Patent No.: US 10,124,685 B2
(45) Date of Patent: Nov. 13, 2018

(54) POWER RECEPTION DEVICE HAVING A COIL FORMED LIKE A FLAT PLATE

(71) Applicants: TOYOTA JIDOSHA KABUSHIKI KAISHA, Toyota-shi, Aichi-ken (JP); YAZAKI CORPORATION, Tokyo (JP)

(72) Inventors: Hiroaki Yuasa, Nissin (JP); Satoru Horiuchi, Toyota (JP); Masayuki Kataoka, Kakegawa (JP); Hitoshi Takemura, Susono (JP)

(73) Assignees: TOYOTA JIDOSHA KABUSHIKI KAISHA, Toyota (JP); YAZAKI CORPORATION, Tokyo (JP)

( * ) Notice: Subject to any disclaimer, the term of this patent is extended or adjusted under 35 U.S.C. 154(b) by 91 days.

(21) Appl. No.: 15/035,778

(22) PCT Filed: Nov. 11, 2014

(86) PCT No.: PCT/JP2014/079794
§ 371 (c)(1),
(2) Date: May 11, 2016

(87) PCT Pub. No.: WO2015/072436
PCT Pub. Date: May 21, 2015

(65) Prior Publication Data
US 2016/0288654 A1 Oct. 6, 2016

(30) Foreign Application Priority Data
Nov. 18, 2013 (JP) ................. 2013-237848

(51) Int. Cl.
*B60L 11/18* (2006.01)
*B60K 1/04* (2006.01)
(Continued)

(52) U.S. Cl.
CPC ............ *B60L 11/182* (2013.01); *B60K 1/04* (2013.01); *B60L 5/00* (2013.01); *B60L 11/18* (2013.01);
(Continued)

(58) Field of Classification Search
CPC ...... B60L 11/182; B60L 11/1838; B60L 5/00; B60L 11/18; H02J 50/10; H01F 27/2847; H01F 38/14; B60K 1/04
See application file for complete search history.

(56) References Cited

U.S. PATENT DOCUMENTS 5,907,231 A 5/1999 Watanabe et al.
6,649,844 B2 * 11/2003 Kusumoto ............... H02K 3/12
174/128.1
(Continued)

FOREIGN PATENT DOCUMENTS

AU 2006269374 B2 1/2007
AU 2007349874 A2 10/2008
(Continued)

Primary Examiner — Jared Fureman
Assistant Examiner — Michael Warmflash
(74) Attorney, Agent, or Firm — Oliff PLC

(57) ABSTRACT

A power reception device includes a flat plate-like core and a coil spirally wound around the core and having a winding central axis extending in a horizontal direction. The coil is formed like a flat plate to have a longer side portion and a shorter side portion when the coil is viewed in cross section at a plane perpendicular to an extending direction of the coil. The coil is wound around the core such that the longer side portion faces a surface of the core. Therefore, the thickness of the power reception device can be reduced.

8 Claims, 5 Drawing Sheets

(51) Int. Cl.
   *B60L 5/00*   (2006.01)
   *H01F 38/14*  (2006.01)
   *H01F 27/28*  (2006.01)
   *H02J 50/10*  (2016.01)

(52) U.S. Cl.
   CPC ...... *B60L 11/1838* (2013.01); *H01F 27/2847* (2013.01); *H01F 38/14* (2013.01); *H02J 50/10* (2016.02)

(56) References Cited

U.S. PATENT DOCUMENTS

| | | | |
|---|---|---|---|
| 7,741,734 | B2 | 6/2010 | Joannopoulos et al. |
| 2002/0050395 | A1 | 5/2002 | Kusumoto et al. |
| 2002/0093410 | A1* | 7/2002 | Nakayama .......... H01F 27/2823 336/182 |
| 2007/0222542 | A1 | 9/2007 | Joannopoulos et al. |
| 2007/0241848 | A1* | 10/2007 | Sano .................. H01F 17/045 335/213 |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |
| 2010/0065352 | A1* | 3/2010 | Ichikawa ............. B60L 11/182 180/65.8 |
| 2010/0096934 | A1 | 4/2010 | Joannopoulos et al. |
| 2010/0102639 | A1 | 4/2010 | Joannopoulos et al. |
| 2010/0102640 | A1 | 4/2010 | Joannopoulos et al. |
| 2010/0102641 | A1 | 4/2010 | Joannopoulos et al. |
| 2010/0117455 | A1 | 5/2010 | Joannopoulos et al. |
| 2010/0117456 | A1 | 5/2010 | Karalis et al. |
| 2010/0123353 | A1 | 5/2010 | Joannopoulos et al. |
| 2010/0123354 | A1 | 5/2010 | Joannopoulos et al. |
| 2010/0123355 | A1 | 5/2010 | Joannopoulos et al. |
| 2010/0127573 | A1 | 5/2010 | Joannopoulos et al. |
| 2010/0127574 | A1 | 5/2010 | Joannopoulos et al. |
| 2010/0127575 | A1 | 5/2010 | Joannopoulos et al. |
| 2010/0133918 | A1 | 6/2010 | Joannopoulos et al. |
| 2010/0133919 | A1 | 6/2010 | Joannopoulos et al. |
| 2010/0133920 | A1 | 6/2010 | Joannopoulos et al. |
| 2010/0171370 | A1 | 7/2010 | Karalis et al. |
| 2010/0181844 | A1 | 7/2010 | Karalis et al. |
| 2010/0187911 | A1 | 7/2010 | Joannopoulos et al. |
| 2010/0201205 | A1 | 8/2010 | Karalis et al. |
| 2010/0207458 | A1 | 8/2010 | Joannopoulos et al. |
| 2010/0225175 | A1 | 9/2010 | Karalis et al. |
| 2010/0231053 | A1 | 9/2010 | Karalis et al. |
| 2010/0237706 | A1 | 9/2010 | Karalis et al. |
| 2010/0237707 | A1 | 9/2010 | Karalis et al. |
| 2010/0237708 | A1 | 9/2010 | Karalis et al. |
| 2010/0253152 | A1 | 10/2010 | Karalis et al. |
| 2010/0264745 | A1 | 10/2010 | Karalis et al. |
| 2011/0140539 | A1 | 6/2011 | Yamamoto et al. |
| 2012/0103741 | A1* | 5/2012 | Suh .................. B60L 11/007 191/10 |
| 2013/0093257 | A1* | 4/2013 | Goto .................. H01F 38/14 307/104 |
| 2013/0135077 | A1* | 5/2013 | Shijo .................. H01F 27/00 336/221 |
| 2013/0193749 | A1* | 8/2013 | Nakamura ............ B60L 3/00 307/9.1 |
| 2013/0313912 | A1* | 11/2013 | Abe .................. H02J 5/005 307/104 |
| 2015/0091514 | A1* | 4/2015 | Yuasa ............... B60L 11/182 320/108 |
| 2015/0102684 | A1* | 4/2015 | Tanaka ............... H02J 50/12 307/104 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101064210 A | 10/2007 |
| CN | 101258658 A | 9/2008 |
| CN | 101682216 A | 3/2010 |
| CN | 101860089 A | 10/2010 |
| CN | 102405580 A | 4/2012 |
| CN | 103329397 A | 9/2013 |
| EP | 1 902 505 A2 | 3/2008 |
| EP | 2 130 287 A | 12/2009 |
| IN | 735/DELNP/2008 | 5/2008 |
| IN | 6195/DELNP/2009 | 7/2010 |
| JP | H04-99311 U | 8/1992 |
| JP | H08-22720 A | 1/1996 |
| JP | H10-106866 A | 4/1998 |
| JP | 2002-027693 A | 1/2002 |
| JP | 2002-208527 A | 7/2002 |
| JP | 2009-501510 A | 1/2009 |
| JP | 2010-172084 A | 8/2010 |
| JP | 2011-124129 A | 6/2011 |
| JP | 2012-175741 A | 9/2012 |
| JP | 2013-106477 A | 5/2013 |
| JP | 2013-146154 A | 7/2013 |
| JP | 2013-154815 A | 8/2013 |
| JP | 2015-035494 A | 2/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2012/037279 A1 | 3/2012 |

* cited by examiner

POWER RECEPTION DEVICE HAVING A COIL FORMED LIKE A FLAT PLATE

TECHNICAL FIELD

The present invention relates to a power reception device that receives electric power in a contactless manner from a power transmission device provided outside a vehicle.

BACKGROUND ART

A power reception device and a power transmission device that transfer electric power in a contactless manner are known. Each of these devices includes a core and a coil wound around the core. As disclosed in PTD 1 described below, a coil having a round cross-sectional shape is generally used as the coil (coil wire). PTDs 2 and 3 described below disclose a litz wire having a round cross-sectional shape. This litz wire is formed by twisting a plurality of enamel wires or the like together.

CITATION LIST

Patent Document

PTD 1: Japanese Patent Laying-Open No. 2013-154815
PTD 2: Japanese Utility Model Laying-Open No. 04-099311
PTD 3: Japanese Patent Laying-Open No. 08-022720

SUMMARY OF INVENTION

Technical Problem

Since a power reception device is arranged on a bottom surface of a vehicle, a reduction in thickness of the power reception device is required from the perspectives of interference with the ground, vehicle height restriction and the like. In a power reception device including a so-called solenoid-type coil unit, a core thickness and a thickness that is twice as great as a coil wire diameter are at least needed. In the conventional art, a coil wire having a round shape has been used as a coil wire, and thus, a power reception device has been thick by a thickness corresponding to the coil wire diameter, which has impeded the reduction in thickness of the power reception device.

The present invention has been made in view of the aforementioned circumstances, and an object of the present invention is to provide a power reception device that can be reduced in thickness.

Solution to Problem

A power reception device includes: a flat plate-like core; and a coil spirally wound around the core and having a winding central axis extending in a horizontal direction. The coil is formed like a flat plate to have a longer side portion and a shorter side portion when the coil is viewed in cross section at a plane perpendicular to an extending direction of the coil. The coil is wound around the core such that the longer side portion faces a surface of the core.

Advantageous Effects of Invention

According to the configuration described above, the coil is arranged such that the longer side portion of the coil faces the surface of the core, and thus, a thickness can be reduced as compared with, for example, the case of using a round shape coil (coil wire) having the same cross-sectional area.

DESCRIPTION OF EMBODIMENTS

Figure 1:
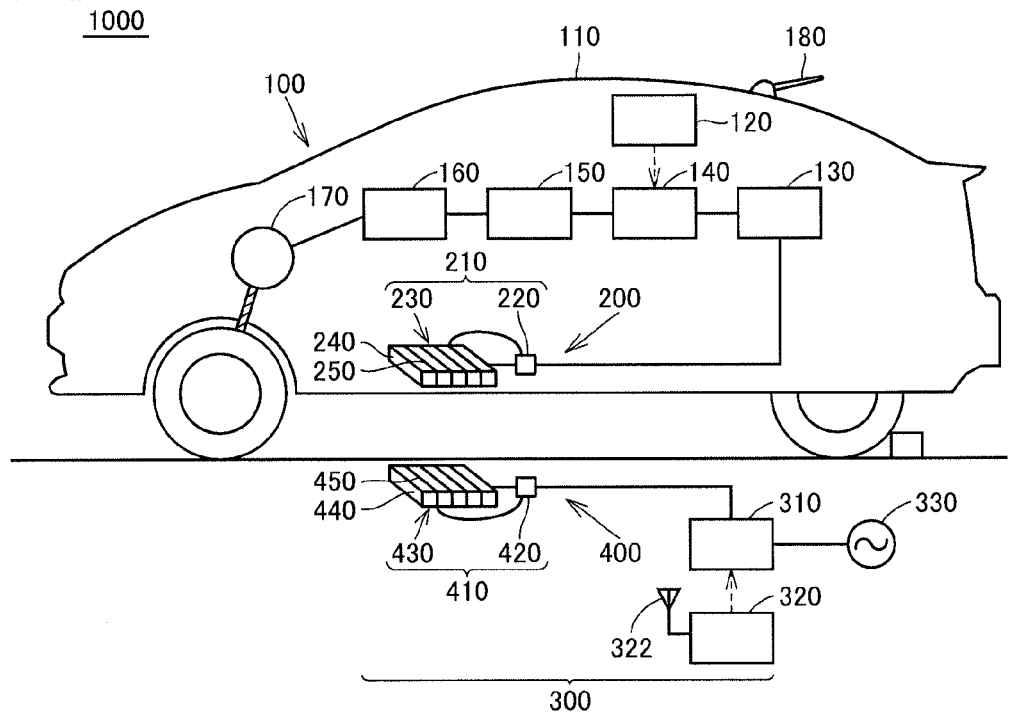
FIG. 1 is a diagram schematically showing a power transfer system in an embodiment.

An embodiment will be described hereinafter with reference to the drawings. When the number, an amount or the like is mentioned, the scope of the present invention is not necessarily limited to that number, that amount or the like, unless otherwise specified. The same and corresponding components are denoted by the same reference numerals, and redundant description will not be repeated.

(Power Transfer System 1000)

FIG. 1 is a diagram schematically showing an overall configuration of a power transfer system 1000 to which a power reception device 200 in an embodiment is applied. Power transfer system 1000 includes an electric powered vehicle 100 and an external power feeding device 300. Electric powered vehicle 100 includes a vehicle main body 110 and power reception device 200. Vehicle main body 110 has a vehicle ECU 120, a rectifier 130, a DC/DC converter 140, a battery 150, a power control unit 160, a motor unit 170, a communication unit 180 and the like. Power reception device 200 is connected to rectifier 130. Power reception device 200 has a power reception coil 250 (coil) and is arranged on a bottom surface of vehicle main body 110.

External power feeding device 300 includes a power transmission device 400, a high-frequency power device 310, a power transmission ECU 320, and a communication unit 322. High-frequency power device 310 is connected to an AC power supply 330. Power transmission device 400 is provided within a parking space and connected to high-frequency power device 310. Power transmission device 400 includes a power transmission unit 410 and a housing (not shown) that houses power transmission unit 410.

Power transmission unit 410 has a solenoid-type coil unit 430, and a capacitor 420 connected to coil unit 430. Coil unit 430 is formed by a flat plate-like core 440 fabricated by using ferrite, a fixing member (not shown) made of resin, for sandwiching and fixing core 440, and a power transmission coil 450 formed to be spirally wound around core 440 with this fixing member being interposed, and to surround a winding central axis (not shown).

In power transfer system 1000, power reception device 200 receives electric power from power transmission device 400 in a contactless manner, with power reception coil 250 facing power transmission coil 450. For example, in the case where vehicle ECU 120 detects that a power feeding button has been turned on when vehicle main body 110 is in a stop state, the operation mode of the vehicle is switched to the charging mode. Through communication unit 180 and communication unit 322, vehicle ECU 120 instructs execution of charging control of battery 150 by external power feeding device 300.

(Power Reception Device 200)

Figure 2:
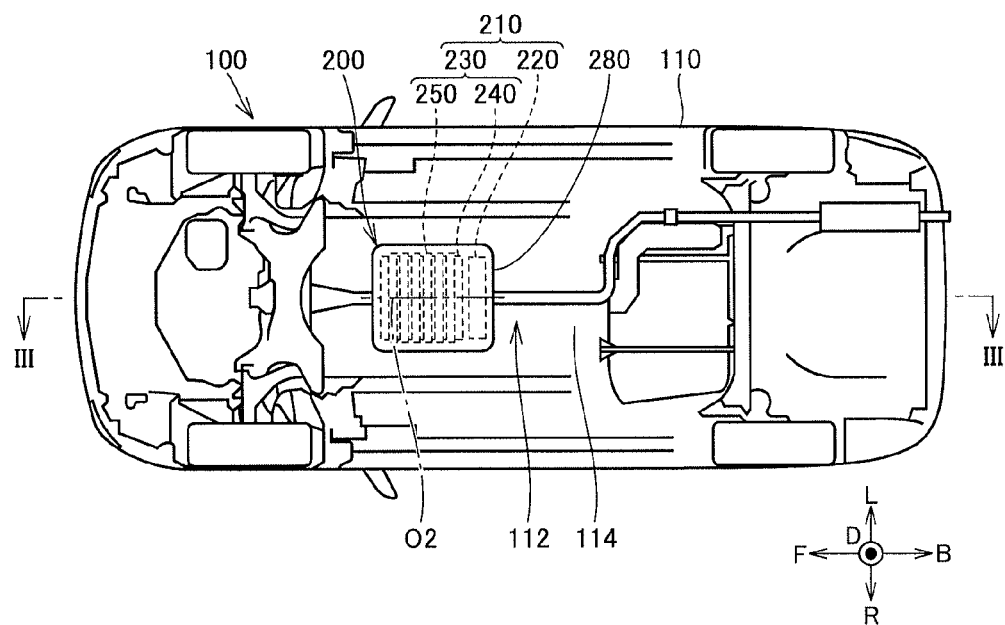
FIG. 2 is a bottom view showing an electric powered vehicle in the embodiment.
Figure 3:
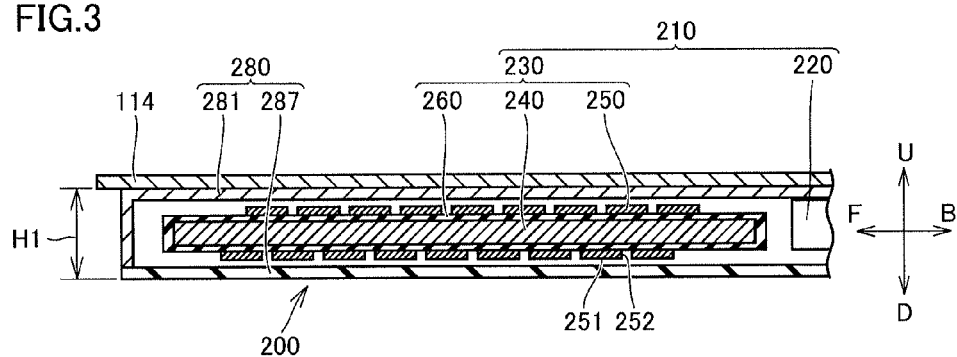
FIG. 3 is a cross-sectional view taken along line III-III in FIG. 2.

Power reception device 200 will be described in more detail with reference to FIGS. 2 and 3. FIG. 2 is a bottom view showing electric powered vehicle 100. FIG. 3 is a cross-sectional view taken along line in FIG. 2. In FIGS. 2 and 3, "D" represents a lower side D in the perpendicular direction. "L" represents a vehicle left direction L. "R" represents a vehicle right direction R. "F" represents a vehicle frontward-moving direction F. "B" represents a vehicle backward-moving direction B. "U" represents an upper side U in the perpendicular direction. These are common in below-described FIGS. 4 to 7 as well.

Referring to FIG. 2, vehicle main body 110 has a bottom surface 112. Bottom surface 112 refers to a visible region of vehicle main body 110 when vehicle main body 110 is viewed from a position that is distant from the ground in the direction of lower side D in the perpendicular direction, with wheels of electric powered vehicle 100 being in contact with the ground. Bottom surface 112 is provided with a floor panel 114 and the like. Power reception device 200 is provided on bottom surface 112 of vehicle main body 110. In order to fix power reception device 200 to bottom surface 112, power reception device 200 may be fixed to floor panel 114, or power reception device 200 may be suspended from a side member or a cross member.

Referring to FIGS. 2 and 3, power reception device 200 includes a power reception unit 210 and a housing 280 that houses power reception unit 210. Housing 280 includes a housing portion 281 (FIG. 3) having a shape of being open toward the lower side, and a bottom portion 287 (FIG. 3) that closes the opening of housing portion 281. Housing portion 281 is formed by a member made of metal such as copper, and bottom portion 287 is formed by a member made of resin.

Power reception unit 210 has a solenoid-type coil unit 230, and a capacitor 220 connected to coil unit 230 (refer to FIG. 1 as well). Coil unit 230 is formed by a flat plate-like core 240 fabricated by using ferrite, a fixing member 260 (refer to FIG. 3) made of resin, for sandwiching and fixing core 240, and power reception coil 250 formed to be spirally wound around core 240 with fixing member 260 being interposed, and to surround a winding central axis O2 (refer to FIG. 2).

Winding central axis O2 of power reception coil 250 extends in a horizontal direction. In other words, in a state of electric powered vehicle 100 being arranged on the horizontal ground, winding central axis O2 of power reception coil 250 is parallel to the horizontal direction. In the present embodiment, winding central axis O2 is also parallel to a frontward-backward direction of vehicle main body 110. The winding central axis of power transmission coil 450 (refer to FIG. 1) also extends in the horizontal direction. It is intended that when electric powered vehicle 100 is parked at a prescribed position in the parking space where power transfer is possible, winding central axis O2 of power reception coil 250 and the winding central axis of power transmission coil 450 (FIG. 1) are parallel to each other.

The aforementioned horizontal direction is not limited to a completely horizontal direction and includes a substantially horizontal direction as well. The substantially horizontal direction includes a state of being displaced from the horizontal direction within a range of more than 0° to not more than ±15°. Each winding central axis may preferably extend within an angular range of not less than −10° to not more than 10° with respect to the horizontal direction, and more preferably extend within an angular range of not less than −5° to not more than 5° with respect to the horizontal direction, and optimally extend in the horizontal direction.

As shown in FIG. 3, power reception coil 250 has a so-called edgewise coil shape. Power reception coil 250 is formed like a flat plate to have a longer side portion 251 and a shorter side portion 252 when power reception coil 250 is viewed in cross section at a plane perpendicular to an extending direction of power reception coil 250. Power reception coil 250 has a rectangular cross-sectional shape and has two longer side portions 251 and two shorter side portions 252. A length of longer side portion 251 is longer than a length of shorter side portion 252. Power reception coil 250 is wound around core 240 with fixing member 260 being interposed, such that longer side portion 251 faces a surface of core 240 (with fixing member 260 being interposed). Namely, power reception coil 250 is arranged such that longer side portion 251 is along the surface of flat plate-like core 240.

Power reception coil 250 formed like a flat plate and having longer side portion 251 and shorter side portion 252 is not limited to a coil having a rectangular cross-sectional shape, and a coil having an oval cross-sectional shape may be used. The oval shape refers to a shape formed by changing a rectangular shape such that four corners of the rectangular shape are rounded. As long as power reception coil 250 has different length and breadth in a cross-sectional shape and has longer side portion 251 and shorter side portion 252, power reception coil 250 formed like a flat plate may have a shape other than the rectangular shape and the oval shape. "Side" herein is not limited to a straight section and includes a curved section as well. Namely, as long as power reception coil 250 has a longitudinal direction in a cross-sectional shape and has longer side portion 251 and shorter side portion 252, power reception coil 250 formed like a flat plate may have, for example, an elliptical shape.

Power reception coil 250 having the cross-sectional shape described above is formed, for example, by tying a plurality of thin copper wires together to fabricate a copper wire bundle, and winding the copper wire bundle around fixing member 260. Power reception coil 250 is not limited to this configuration and may be formed by tying a plurality of thin copper wires together to fabricate a copper wire bundle, and covering the copper wire bundle with an insulator to form a coil wire, and winding the coil wire around fixing member 260. Power reception coil 250 may be formed by tying a plurality of thin litz wire bundles together to form a coil wire, and winding the coil wire around fixing member 260.

Power reception device 200 described above is arranged such that longer side portion 251 of power reception coil 250 faces the surface of core 240 (fixing member 260). Magnetic flux density=magnetic flux/(coil cross-sectional area×number of turns), and thus, for example, when conditions for obtaining the same magnetic flux density are compared, i.e., when the case of using power reception coil 250 is compared with the case of using a round shape coil (coil wire) having the same coil cross-sectional area as that of power reception coil 250, a dimension value of the power reception device in a thickness direction can be made smaller in the case of using power reception coil 250. Therefore, the thickness of the power reception device can be reduced.

Figure 4:
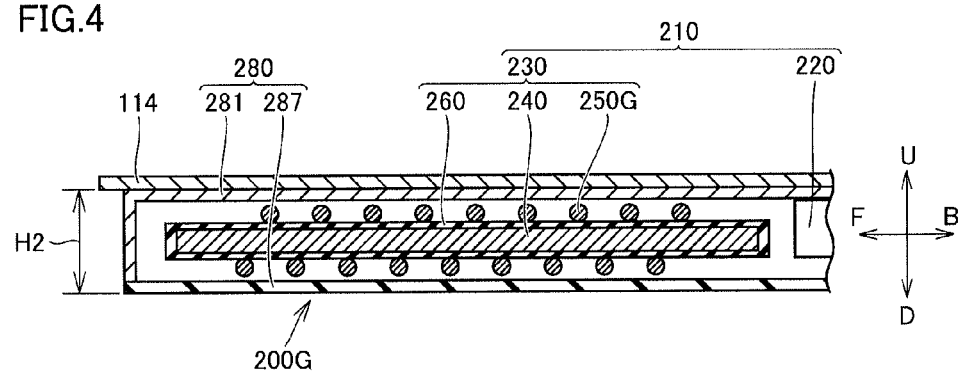
FIG. 4 is a cross-sectional view showing a power reception device in Comparative Example.

FIG. 4 is a cross-sectional view showing, as Comparative Example, a power reception device 200G including a power reception coil 250G having a round shape. Since power reception coil 250G does not have a longer side portion and a shorter side portion, it is difficult to reduce a thickness of power reception device 200G. Therefore, a thickness H1 of power reception device 200 shown in FIG. 3 can be smaller than a thickness H2 of power reception device 200G. Power reception device 200 in the present embodiment can be arranged in a smaller (thinner) space as compared with power reception device 200G in Comparative Example, and thus, power reception device 200 in the present embodiment is recognized to be superior in interference with the ground, vehicle height restriction and the like.

Figure 5:
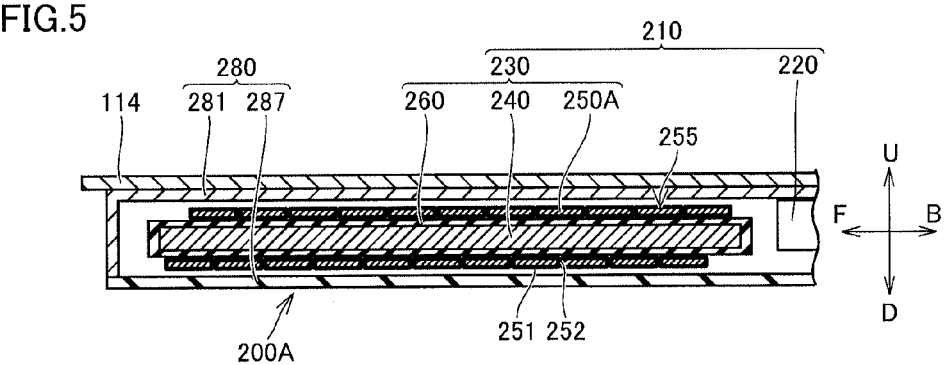
FIG. 5 is a cross-sectional view showing a power reception device in a first modification.

FIG. 5 is a cross-sectional view showing a power reception device 200A in a first modification. In power reception device 200A, a power reception coil 250A is used. Similarly to power reception coil 250 (FIG. 3) described above, power reception coil 250A has longer side portion 251 and shorter side portion 252, and is further provided with a sheath 255 (outer sheath insulator) on a surface thereof. Adjacent power reception coils 250A (coil portions) are closely arranged to be in contact with each other. Since a coil wire gap can be reduced, the magnetic flux density can be increased by increasing the number of turns, for example. Alternatively, when the magnetic flux density is not increased, a dimension of the power reception device in an extending direction of a winding central axis can be reduced by closely arranging the power reception coils. Namely, it is possible to reduce the dimension of the power reception device in the extending direction of the winding central axis while suppressing an increase in thickness of the power reception device.

Figure 6:
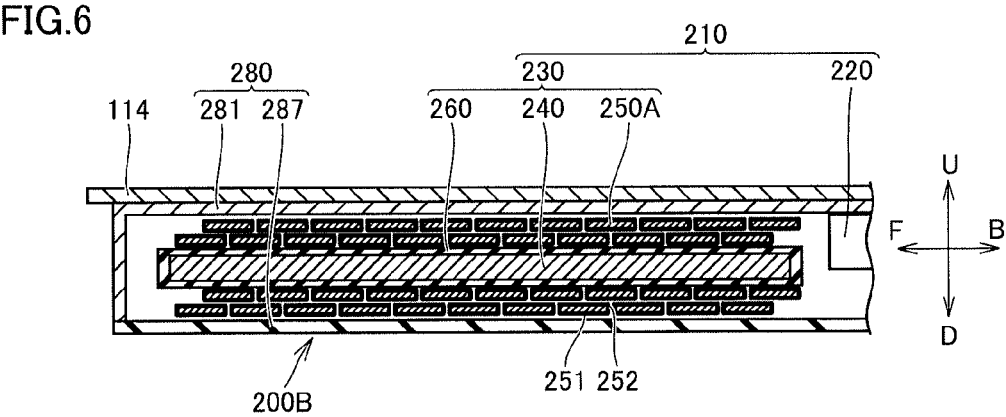
FIG. 6 is a cross-sectional view showing a power reception device in a second modification.

FIG. 6 is a cross-sectional view showing a power reception device 200B in a second modification. In power reception device 200B as well, power reception coil 250A is used. Power reception coil 250A is wound in a double winding manner (in a multistage winding manner) such that an inner wound portion and an outer wound portion are formed. By utilizing the feature that power reception coil 250A has a flat plate-like shape, such a layout can be achieved, and it is possible to increase the magnetic flux density, to reduce a dimension of the power reception device in an extending direction of a winding central axis, and to reduce the dimension of the power reception device in the extending direction of the winding central axis while suppressing an increase in thickness of the power reception device.

Figure 7:
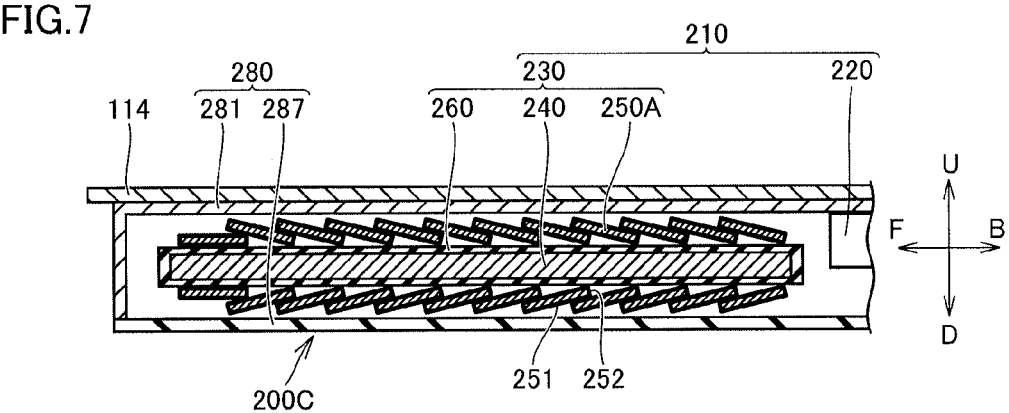
FIG. 7 is a cross-sectional view showing a power reception device in a third modification.

FIG. 7 is a cross-sectional view showing a power reception device 200C in a third modification. In power reception device 200C as well, power reception coil 250A is used. Although power reception coil 250A has a so-called single winding structure, power reception coil 250A is wound such that coil portions of adjacent power reception coils 250A partially overlap each other. With this configuration as well, it is possible to increase the magnetic flux density, to reduce a dimension of the power reception device in an extending direction of a winding central axis, and to reduce the dimension of the power reception device in the extending direction of the winding central axis while suppressing an increase in thickness of the power reception device. In the examples shown in FIGS. 6 and 7, a triple winding structure can also be used and a multistage structure having more than triple windings may be used, as needed.

Figure 8:
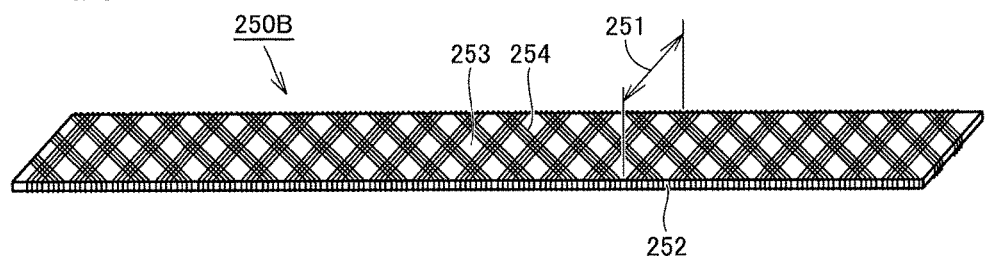
FIG. 8 is a perspective view showing a power reception coil used in a power reception device in a fourth modification.
Figure 9:
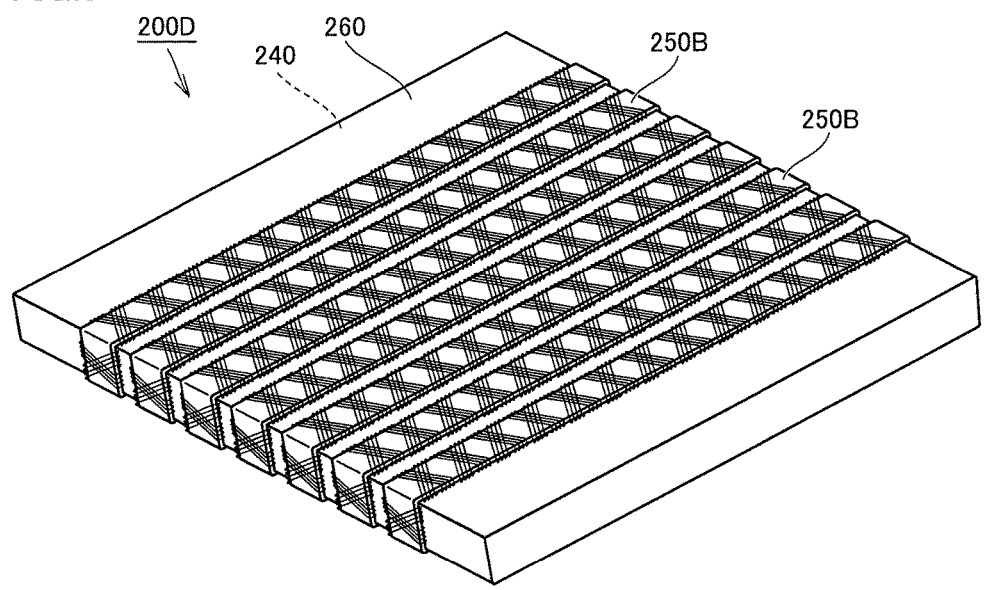
FIG. 9 is a perspective view showing the power reception device in the fourth modification.

FIG. 8 is a perspective view showing a power reception coil 250B used in a power reception device 200D (refer to FIG. 9) in a fourth modification. FIG. 9 is a perspective view showing power reception device 200D in the fourth modification. For the sake of convenience, FIG. 9 does not show a housing and the like of power reception device 200D. As shown in FIGS. 8 and 9, power reception coil 250D has a so-called flat braiding wire structure.

Specifically, power reception coil 250D includes a base member 253 having a flat strip-like shape and a plurality of wires 254 wound around base member 253 in a braiding manner. Wires 254 are conductive thin wires, and the plurality of wires 254 bundled and braided or twisted are wound around base member 253. Similarly to power reception coil 250 (FIG. 3) described above, power reception coil 250B also has longer side portion 251 and shorter side portion 252, and is spirally wound around core 240 with fixing member 260 being interposed (refer to FIG. 9).

With the configuration of power reception coil 250D as well, it is possible to suppress an increase in thickness of the power reception device. Namely, when the case of using power reception coil 250B is compared with the case of using a round shape coil (coil wire) having the same coil cross-sectional area as that of power reception coil 250B, a dimension value of the power reception device in a thickness direction can be made smaller in the case of using power reception coil 250B. Therefore, the thickness of the power reception device can be reduced.

In the case of using power reception coil 250B, the advantage of becoming less likely to be affected by the proximity effect is also obtained. The proximity effect is a phenomenon in which an AC resistance (high-frequency resistance) increases and/or an amount of heat generation increases due to an influence of a magnetic field generated from a proximally arranged conductor. According to power reception coil 250B, even when the proximity effect occurs, this proximity effect is dispersed into the proximity effect on the inside (in other words, the proximity effect is dispersed into the effect on other currents in the same flux), and thus, the proximity effect on the outside (the effect on currents flowing through other fluxes) can be reduced. As a result, the AC resistance (high-frequency resistance) is reduced and the amount of heat generation is reduced, and thus, the configuration excellent in heat dissipation capability can be achieved.

In the configurations of PTD 2 (Japanese Utility Model Laying-Open No. 04-099311) and PTD 3 (Japanese Patent Laying-Open No. 08-022720) described in the beginning, a litz wire having a round cross-sectional shape is used. In the case of using the litz wire having a round cross-sectional shape, it is not only conceivable that the power reception device becomes thick, but also conceivable that the AC resistance (high-frequency resistance) increases due to the influence of the proximity effect.

Figure 10:
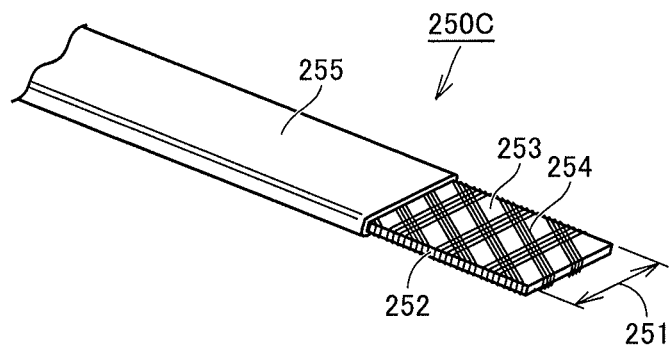
FIG. 10 is a perspective view showing a power reception coil used in a power reception device in a fifth modification.

FIG. 10 is a perspective view showing a power reception coil 250C used in a power reception device (not shown) in a fifth modification. In addition to the configuration of power reception coil 250B (FIG. 8) described above, power reception coil 250C further has sheath 255 having an insulation property. Sheath 255 covers and protects base member 253 and wires 254 wound around base member 253.

The case of winding power reception coil 250B (refer to FIGS. 8 and 9) of the fourth modification described above around fixing member 260 (core 240) is assumed. An end (a part corresponding to a folded back portion of power reception coil 250B) of fixing member 260 may have a square shape in some cases. Since wires 254 of power reception coil 250B are not covered and exposed, wires 254 may be rubbed against or caught in the end of fixing member 260.

In contrast, in power reception coil 250C (FIG. 10) of the present modification, wires 254 are covered and protected by sheath 255, and thus, wires 254 are not rubbed against or caught in the end of fixing member 260. Since damage of wires 254 and occurrence of a break in wires 254 are suppressed, a lifetime of power reception coil 250C can be extended. Power reception coil 250C may be fabricated by tube extrusion (FIG. 11), or may be fabricated by full extrusion (FIG. 12).

Figure 11:
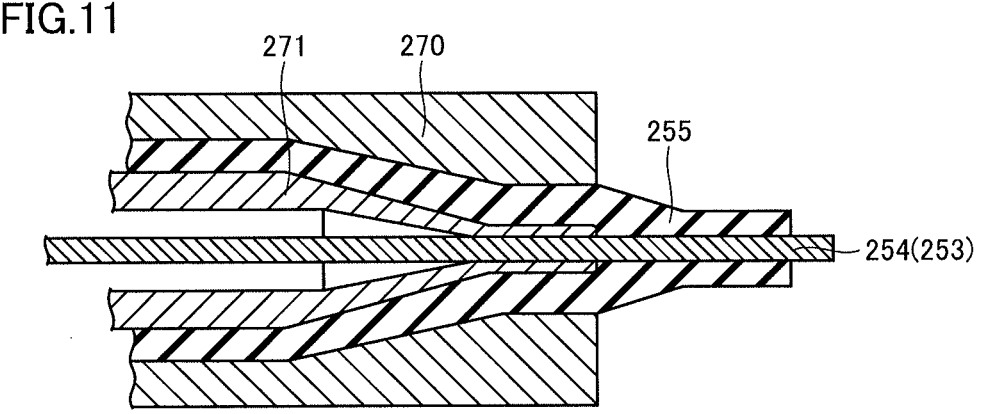
FIG. 11 is a cross-sectional view for describing a method for manufacturing the power reception coil used in the power reception device in the fifth modification (tube extrusion).

Referring to FIG. 11, in the case of fabricating power reception coil 250C by tube extrusion, a mouthpiece 270 and a mandrel 271 are prepared. Base member 253 having wires 254 wound therearound is arranged in mouthpiece 270 in a preheated state and is positioned by mandrel 271. Thereafter, an insulating resin (such as a polyethylene resin) poured into between an inner surface of mouthpiece 270 and an outer surface of mandrel 271 is extruded in a tube-like manner from an opening of mouthpiece 270 toward the right side on the sheet of FIG. 11, and is solidified by cooling. Thus, base member 253 having wires 254 wound therearound is covered with sheath 255.

Figure 12:
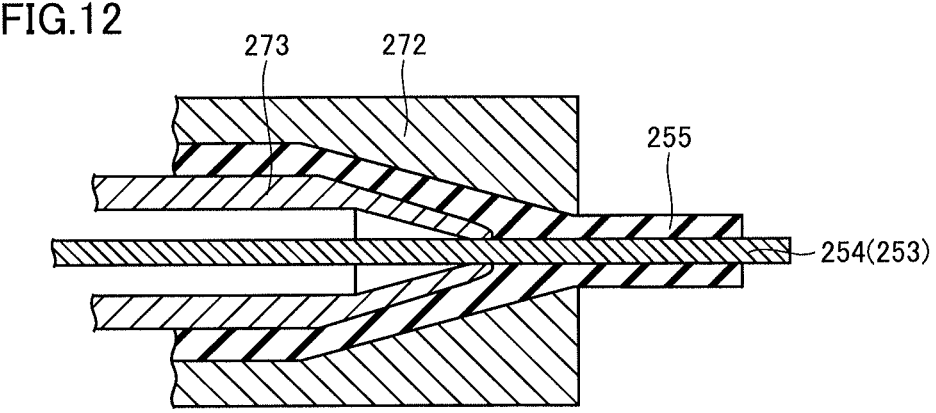
FIG. 12 is a cross-sectional view for describing a method for manufacturing the power reception coil used in the power reception device in the fifth modification (full extrusion).

Referring to FIG. 12, in the case of fabricating power reception coil 250C by full extrusion, a mouthpiece 272 and a mandrel 273 are prepared. An end of mandrel 273 (an end of mandrel 273 located on the right side on the sheet of FIG. 12) is located inside mouthpiece 272. Base member 253 having wires 254 wound therearound is arranged in mouthpiece 272 in a preheated state and is positioned by mandrel 273. Thereafter, a resin poured into between an inner surface of mouthpiece 272 and an outer surface of mandrel 273 is extruded from an opening of mouthpiece 272 toward the right side on the sheet of FIG. 12, and is solidified by cooling. Thus, base member 253 having wires 254 wound therearound is covered with sheath 255.

Here, in the case of full extrusion (FIG. 12), a pressing pressure is applied from the resin to wires 254 when the resin covers wires 254 (FIG. 10), and a gap between adjacent wires 254 is filled with the resin. In the case of forming sheath 255 by full extrusion, the pressure is applied to wires 254 (litz wires). Therefore, from the perspective of preventing a break in wires 254 more reliably, fabrication of power reception coil 250C by tube extrusion is suitable.

In the case of tube extrusion (FIG. 11), the resin is extruded in a tube-like manner along the perimeter of base member 253 having wires 254 wound therearound, and a covering thickness of sheath 255 is substantially constant. Therefore, as compared with the case of full extrusion, adhesion between wires 254 and sheath 255 can also be reduced. Since the adhesion between wires 254 and sheath 255 is low, application of a local stress to wires 254 of power reception coil 250C near the end of fixing member 260 when power reception coil 250C is wound around fixing member 260 (core 240) is also suppressed, and a break in wires 254 can be prevented more reliably.

The foregoing embodiment and modifications have been described based on the configuration in which the power reception coil is formed like a flat plate to have the longer side portion and the shorter side portion in the cross-sectional shape, and the power reception coil is wound such that the longer side portion of the power reception coil faces the surface of the core. However, such a configuration is also applicable to the power transmission coil of the power transmission device. Namely, according to a configuration in which the power transmission coil is formed like a flat plate to have a longer side portion and a shorter side portion in a cross-sectional shape, and the power transmission coil is wound such that the longer side portion of the power transmission coil faces a surface of the core, a thickness of the power transmission device can be reduced.

Although the embodiment and the modifications based on the present invention have been described above, the embodiment and the modifications disclosed herein are illustrative and not limitative in any respect. The technical scope of the present invention is defined by the terms of the claims, and is intended to include any modifications within the scope and meaning equivalent to the terms of the claims.

REFERENCE SIGNS LIST 100 electric powered vehicle; 110 vehicle main body; 112 bottom surface; 114 floor panel; 130 rectifier; 200, 200A, 200B, 200C, 200D, 200G power reception device; 210 power reception unit; 220, 420 capacitor; 230, 430 coil unit; 240, 440 core; 250, 250A, 250B, 250C, 250D, 250G power reception coil (coil); 251 longer side portion; 252 shorter side portion; 253 base member; 254 wire; 255 sheath; 260 fixing member; 270, 272 mouthpiece; 271, 273 mandrel; 280 housing; 400 power transmission device; 410 power transmission unit; 450 power transmission coil; H1, H2 thickness; O2 winding central axis.

The invention claimed is:

1. A power reception device, comprising:
a flat plate-like core; and
a coil spirally wound around the core and having a winding central axis extending in a horizontal direction,
the coil being formed like a flat plate to have a longer side portion and a shorter side portion when the coil is viewed in cross section at a plane perpendicular to an extending direction of the coil,
the coil being wound around the core such that the longer side portion faces a surface of the core, and
the coil being wound around the core in a multi-layer winding manner.

2. The power reception device according to claim 1, wherein
an outer sheath insulator is provided on the surface of the coil and adjacent coils are arranged to be in contact with each other.

3. The power reception device according to claim 1, wherein
the coil has a flat braiding wire structure.

4. The power reception device according to claim 2, wherein
the coil has a flat braiding wire structure.

5. A power reception device, comprising:
a flat plate-like core; and
a coil spirally wound around the core and having a winding central axis extending in a horizontal direction,
the coil being formed like a flat plate to have a longer side portion and a shorter side portion when the coil is viewed in cross section at a plane perpendicular to an extending direction of the coil,
the coil being wound around the core such that the longer side portion faces a surface of the core, and the coil being wound around the core such that adjacent coil portions partially overlap each other.

6. The power reception device according to claim 5, wherein an outer sheath insulator is provided on the surface of the coil and adjacent coils are arranged to be in contact with each other.

7. The power reception device according to claim 5, wherein the coil has a flat braiding wire structure.

8. The power reception device according to claim 6, wherein the coil has a flat braiding wire structure.

* * * * *